United States Patent Office
3,548,638
Patented Dec. 22, 1970

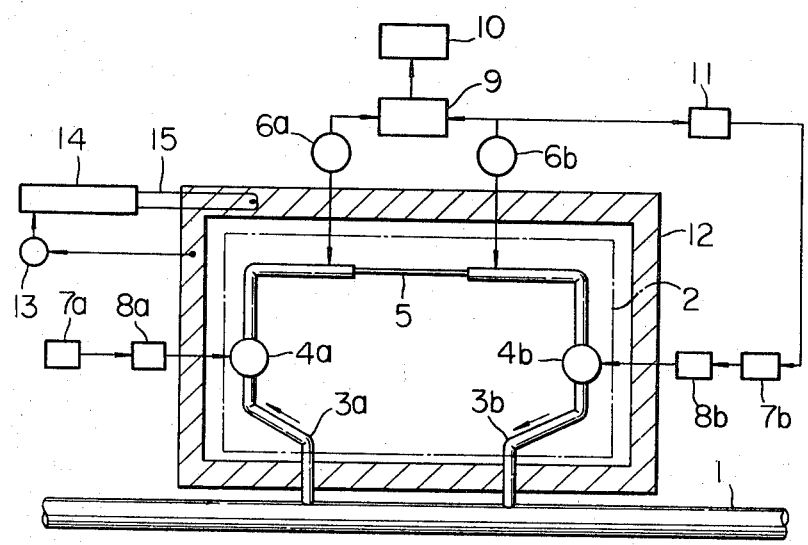

3,548,638
APPARATUS AND METHOD FOR CONTINUOUSLY DETERMINING VISCOSITY
Mitsuo Uchida, Ibaragi-shi, Yasumasa Nakamura, Ashiya-shi, Toshio Hamachi, Nishinomiya-shi, Akio Ando and Toru Yamazaki, Otsu-shi, Koichi Terao, Sunto-gun, and Shinzo Osumi, Otsu-shi, Japan, assignors to Toray Industries, Inc., Tokyo, Japan, a company of Japan
Filed Oct. 3, 1968, Ser. No. 764,870
Claims priority, application Japan, Oct. 5, 1967, 42/64,171
Int. Cl. G01n 11/04
U.S. Cl. 73—55                        4 Claims

ABSTRACT OF THE DISCLOSURE

A fine tube viscosimeter employing a by-pass conduit provided with a fine tube and connected to a main conduit of a process line. Two pumps are independently inserted within the by-pass conduit sandwiching the fine tube for introduction and discharge of the liquid from and into the main conduit. Loss of the liquid pressure passing through the fine tube is picked up and used for determination of the liquid viscosity and further for control of the pump revolution. The upstream pump is driven at a faster speed than the downstream pump.

---

This invention relates to an apparatus and method for continuously determining the viscosity of a fluid of high mer liquid having high viscosity in a condition of high temperature and pressure.

Several viscosimeters based upon different principles are well-known but there are only a few viscosimeters for continuously determining viscosity of a fluid of high polypolymer liquid having high viscosity in a condition of high temperature and pressure with the exception of the viscosimeter comprising rotation type double cylinder disposed within a path of the liquid to be tested wherein the liquid is heated by a jacket.

It is well-known that the other types of viscosimeter are not practical for industrial use because of certain troubles for operating the viscosimeter caused by high temperature and pressure or viscosity of the liquid.

The above-mentioned viscosimeter comprising double cylinder also has several drawbacks which makes it unsuitable for practical use. That is, in the viscosimeter of this type, the measuring portion is provided with movable elements thereby reliable data is difficult to obtain, moreover durability of the viscosimeter is not sufficiently high for long use due to the degradation of a torque tube mounted on it. Further, the measuring element is contained in a main conduit of the process line, therefore it was observed that the variation in liquid pressure in the main conduit of the process line causes variation in the viscosity of the liquid and errors in measurement, particularly when the pressure of the liquid is below 5,000 kg./cm.$^2$, and as the measuring element of the viscosimeter is contained in the main conduit of the process line, maintenance of the viscosimeter can be carried out only when the process is stopped.

It was also noticed that the conventional fine tube viscosimeter, which is usually used in a condition connected to the main conduit of the process line, can hardly be used for actual measurement of viscosity of a high polymer of high viscosity at high temperature and under high pressure. That is, utilization of such conventional fine tube viscosimeter requires considerable improvement in the mechanical construction thereof.

A principal object of the present invention is to provide a durable apparatus for measuring precisely the viscosity of highpolymers having high viscosity in a condition of high temperature and high pressure.

Another object of the present invention is to provide a practical method for measuring the viscosity of highpolymers in a severe condition that the measurement must be operated in a condition of temperature over 100° C. and high liquid pressure over several hundred kilograms per square centimeter and also high viscosity of the liquid having several-ten thousands poise, wherein the viscosity of the liquid varies in accordance with the variation of the temperature and residence time of the liquid in the viscosimeter which is required for maintaining the temperature of the conduit for passing the highpolymer liquid at over the melting point of the highpolymer.

Still another object of the present invention is to provide an apparatus and method for determining the liquid viscosity in the above-mentioned condition and in a condition of low viscosity and temperature and pressure of the liquid.

Further particular object of the present invention is to provide an improved fine tube viscosimeter based upon the well-known formula of Hagen-Poiseuille's Law for determining the viscosity of highpolymer having high viscosity in a condition of high temperature and pressure.

The invention will be described in further detail hereinafter with reference to the drawings wherein:

The simple figure is a schematic diagram showing one arrangement of apparatus for automatically and continuously measuring the viscosity of a stream of liquid according to the present invention.

The viscosimeter of the present invention generally comprises a by-pass conduit connected to a main conduit of the process and a fine tube formed in an intermediate portion of the by-pass conduit and means for measuring the difference in liquid pressure between the both end portions of the fine tube and an indicator of the viscosity corresponding to the output signal of the means for measuring the difference in liquid pressure and means for taking off a portion of the liquid passing through the main conduit and for discharging the liquid from the by-pass conduit to the main conduit.

As shown in the figure, the liquid flows through a main conduit 1 of a certain process and a viscosimeter of the present invention is disposed at an adjacent position to the main conduit 1. The viscosimeter comprises a by-pass conduit or fluid flow path composed of a suction conduit 3, a discharging conduit 3b and a fine tube or restriction 5 disposed between two conduits 3a and 3b to form a single passage of the liquid. A suction pump 4a is mounted to an intermediate portion of the suction conduit 3a while a delivery pump 4b is mounted to an intermediate portion of the delivery conduit 3b as shown in the figure. The by-pass conduit and the pumps 4a and 4b and fine tube 5, etc. form a measuring block 2 which is enclosed in a case 12.

A transducer means comprising a first transducer 6a is located at a position upstream of the fine tube 5 while the second transducer 6b is located at a position downstream of the fine tube 5, both for the purpose of detection of the fluid pressure within the by-pass conduit and conversion thereof into output signals. Between the output terminals of the transducers 6a and 6b is inserted a differential pressure calculating circuit 9. The differential pressure calculating circuit 9 calculates the viscosity of the liquid in the by-pass conduit from the output signals of the transducers 6a and 6b. The output of the differential pressure calculating circuit 9 is indicated by an indicator of the fluid viscosity 10 which provides a visual indication of the viscosity.

In the above-mentioned viscosimeter, the fine tube 5 is changeably mounted. The suction pump 4a is driven at a predetermined rotating speed by way of a motor 7a and its speed reduction device 8a, so as to feed the fluid into the suction conduit 3a at a constant rate. The discharging pump 4b is also driven by way of a motor 7b and its speed reduction device 8b and an adjuster 11 by which the rotation of the motor 7b is regulated to thereby variably set the flow rate of the pump 4b. Abnormal pressures rise results in the measurement circuit if the revolution of the pumps 4a and 4b are not balanced, by which there will be danger of the transducers 6a and 6b becoming overrange. It is therefore necessary to connect the output terminal of the transducer 6b with the input terminal of the adjuster 11 in order to control the revolution of the motor 7b and accordingly variably set the pump flow rate, by which safe operation is possible by controlling the revolution of the pump 4b. Furthermore, it is possible to make the adjuster 11 a manual operation for setting the revolution of the motor 7b at a constant rate. A temperature detector 13 is attached to the case 12 and a heater 15 is inserted into the case 12. Between the two elements 13 and 15, is a temperature controlling device 14 disposed in a connected condition therewith for the purpose of automatic temperature control of the case at a predetermined value.

To clarify the functional features of the present invention, our improvement of the fine tube viscosimeter is hereinafter explained by comparison with the conventional viscosimeter.

The conventional viscosimeter employs only one pump for conveying fluid through a fine tube at a constant flow rate and in view of this, there is the problem of durability of the pump because only one pump is used for sampling from a main conduit of the process line of high liquid pressure and for compensating the pressure loss of the measuring circuit in order to return the fluid to the main conduit of the process line after passing of the liquid through the fine tube. However, in the present invention, a pair of pumps 4a, 4b are inserted in the by-pass conduit in series with the fine tube 5 in between, the first pump 4a feeds a constant quantity of liquid to the fine tube 5 and also increases the liquid pressure in the by-pass conduit before the fine tube 5 so that the pressure loss of the fine tubes is high enough, the second pump 4b is used for increasing the liquid pressure in the by-pass conduit downstream of the pump 4b in order to return the liquid from the fine tube 5 to the main conduit 1 of the process line, consequently the pressure is divided between the two pumps 4a and 4b and this extends the lives of the pumps 4a and 4b considerably.

Secondly, by employing the two transducers 6a and 6b, the absolute liquid pressure at positions upstream and downstream of the fine tube 5 can be detected independently. In order to calculate the difference in liquid pressure using the above-described means with less errors in measurement, it is required that the two absolute liquid pressures should be as small as possible while the difference in pressure should be as large as possible. In order to accomplish this function, one of the features of the present invention is such that the primary pressure of the second pump 4b is maintained at substantially zero gauge pressure or 0 kg./cm.² G or a value close to 0 kg./cm.².

There are two methods for maintaining the primary pressure of the second pump 4b under the above-mentioned condition, that is, in one method, the pressure is controlled by changing the revolution of the second pump 4b by a control signal from the output transducer 6b and in the other method, the second pump 4b is driven at a slightly faster revolution than the first pump and is self-controlled by permitting the primary pressure of the second pump to become a reduced pressure.

In explaining more concretely the accuracy of the differential pressure measurement, in case the viscosity of the liquid to be measured is 50,000 poise, liquid pressure of the process line is 200 kg./cm.² G and pressure loss of the fine tube is 150 kg./cm.², the secondary pressure of the pump must be raised to at least about 450 kg./cm.² if only one pump is used. Further if it is assumed that the pressure loss of the measurement pipe from the outlet of the pump to the inlet of the fine tube is 50 kg./cm.², the pressure at the inlet of the fine tube becomes about 400 kg./cm.² G and the pressure at the outlet of the fine tube becomes about 250 kg./cm.² G. Consequently, pressure gauges for detecting the differential pressure must be provided with scales of about 500 kg./cm.² G and 300 kg./cm.² G at the inlet and the outlet of the fine tube, respectively.

However, in the present invention, two pumps 4a and 4b are used and the pressure load is divided between the suction pump 4a and the discharging pump 4b, the pressure at the inlet of the fine tube becomes 150 kg./cm.² G if the pressure distribution in the measurement by-pass conduit is made such that the secondary pressure of the suction pump 4a is 200 kg./cm.² G and the pressure loss from the outlet of the suction pump 4a to the inlet of the fine tube 5 is made 50 kg./cm.², by which the pressure at the outlet of the fine tube 5 becomes a value close to 0 kg./cm.² G and it is only necessary to increase the pressure to about 250 kg./cm.² G which is sufficient to return the fluid to the process line of 200 kg./cm.² G by means of the discharging pump 4b. Consequently, in comparison with the scale range of the pressure gauge of the above-mentioned conventional case wherein a single pump is used, the scale range of the pressure gauges can be relatively small such as the maximum value of 300 kg./cm.² G and 50 kg./cm.² G at the inlet and outlet, respectively, of the fine tube 5. In other words, the range of the scale of the pressure gauge can be made small because the liquid pressure of the process line can be cut from the liquid pressure of the measurement part between the above-mentioned two pumps 4a and 4b, consequently, it will become possible to measure the liquid pressure loss ΔP of the fine tube 5 with an accuracy about two times of the above-mentioned conventional method.

Next, the effect of the fluctuation of the liquid pressure in the process line on the viscosity of the measurement part of the viscosimeter is considered.

Generally, viscosity (Y) of polymer fluid receives the effect indicated in the following Equation 1 by liquid pressure when the liquid pressure is below 5,000 kg./cm.².

$$Y = Y_0 e^{\alpha P} \quad (1)$$

where $Y_0$ = viscosity at 1 atm.
$\alpha$ = pressure coefficient
P = liquid pressure Therefore it can be understood that, when the liquid pressure in the process line fluctuates, the viscosity of the fluid is affected in accordance with the above-mentioned Equation 1 and the insulation of the liquid pressure takes place in the measurement circuit in case a single pump is used as in the above-mentioned conventional fine tube viscosimeter at the inlet by the pump but the outlet side receives directly the effect of the fluctuation of the liquid pressure of the process line. On the contrary, the measurement circuit of the viscosimeter according to the present invention, is insulated from the process line because pumps 4a and 4b are disposed at the inlet and the outlet of the measurement circuit and consequently, the viscosity of the liquid can be determined without any relation with the fluctuation of the liquid pressure of the process line.

As illustrated above, the viscosimeter of the present invention has the following four remarkable improvements in comparison with the conventional fine tube viscosimeter.

(1) The viscosimeter of the present invention employs at least two pumps disposed independently at positions upstream and downstream of the fine tube along the measuring conduit. Pressure of the liquid of high viscosity, temperature and pressure can be sampled independently by those pumps on its path by-passed from the main conduit. Because the liquid pressure within the measurement conduit is effectively insulated from that within the main conduit in this arrangement, wearing-out of the pumps can be prevented during long use thereof.

(2) Distribution of liquid pressure in the measurement circuit is controlled by the controlling means comprising the transducers, the adjuster and pumps, thereby the viscosity of the high viscous liquid can be measured precisely.

(3) The second pump is driven at a slightly faster revolution speed than the first pump in order to maintain the primary pressure of the second pump substantially at 0 kg./cm.$^2$ G thereby pressure of the liquid at the downstream position of the fine tube is self-controlled without any compulsory external control.

Therefore, the pressure of the process line which is not relative to the differential pressure across the fine tube can be cut from the pressure to be measured, the differential pressure gauge can be precisely graduated in a small range so as to improve the measurement accuracy for the viscosity.

Obviously, many modifications and variations of the invention as herein described may be made without departing from the spirit and scope thereof.

What is claimed is:

1. A viscosimeter for determining viscosity of a fluid comprising: means defining a fluid flow path having a restriction; first means for delivering fluid to an upstream end of said restriction at a constant flow rate; second means for withdrawing fluid from a downstream end of said restriction at a variably settable flow rate; means responsive to the fluid pressure at said downstream end of said restriction for variably setting the flow rate of said second means to effectively maintain substantially zero gauge pressure at said downstream end of said restriction; and means for sensing the fluid pressure drop across said restriction and generating an output signal representative of the fluid viscosity.

2. A viscosimeter according to claim 1; wherein said last-mentioned means comprises transducer means for sensing the fluid pressure at both the upstream and downstream ends of said restriction and generating corresponding signals indicative of the sensed pressures; means for converting said signals into an output signal representative of the fluid viscosity; and means receptive of said output signal for providing a visual indication of the fluid viscosity.

3. A viscosimeter according to claim 2; wherein said means responsive to the fluid pressure at said downstream end of said restriction includes said transducer means responsive to the fluid pressure at said downstream end of said restriction for variably setting the flow rate of said second means to effectively maintain substantially zero gauge pressure at said downstream end of said restriction.

4. A viscosimeter according to claim 3; further including means for heating the fluid during flow thereof through said flow path.

References Cited

UNITED STATES PATENTS

| | | | |
|---|---|---|---|
| 2,791,902 | 5/1957 | Jones, Jr. | 73—55 |
| 3,024,642 | 3/1962 | Jones, Jr. | 73—54 |
| 3,024,643 | 3/1962 | Jones, Jr. | 73—55 |
| 3,116,630 | 1/1964 | Piros | 73—55 |
| 3,209,581 | 10/1965 | Crane et al. | 73—56X |

LOUIS R. PRINCE, Primary Examiner

J. W. ROSKOS, Assistant Examiner